(12) United States Patent
Iwase (10) Patent No.: US 10,620,889 B2
(45) Date of Patent: Apr. 14, 2020

(54) IMAGE ANALYSIS PROCESSING SYSTEM WITH ANALYSIS ADJUSTER, MANAGEMENT APPARATUS, IMAGE PROCESSING APPARATUS, AND PROGRAM

(71) Applicant: KONICA MINOLTA, INC., Chiyoda-ku, Tokyo (JP)

(72) Inventor: Tomohiro Iwase, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/388,100

(22) Filed: Apr. 18, 2019

(65) Prior Publication Data
US 2019/0347056 A1 Nov. 14, 2019

(30) Foreign Application Priority Data
May 8, 2018 (JP) ................. 2018-089729

(51) Int. Cl.
*G06F 3/12* (2006.01)
*G06K 15/02* (2006.01)
*H04N 1/00* (2006.01)

(52) U.S. Cl.
CPC .......... *G06F 3/1219* (2013.01); *G06F 3/1253* (2013.01); *G06F 3/1285* (2013.01); *G06F 3/1297* (2013.01); *G06K 15/1823* (2013.01); *H04N 1/00244* (2013.01); *H04N 1/00344* (2013.01); *H04N 1/00915* (2013.01)

(58) Field of Classification Search
None
See application file for complete search history.

(56) References Cited

U.S. PATENT DOCUMENTS

2013/0003090 A1* 1/2013 Sato .................... G03G 15/5062
358/1.9
2017/0318195 A1* 11/2017 Yamamoto ......... H04N 1/00347

FOREIGN PATENT DOCUMENTS

JP 2008277999 A 11/2008
JP 2014135693 A 7/2014

* cited by examiner

*Primary Examiner* — Thomas D Lee
(74) *Attorney, Agent, or Firm* — Buchanan Ingersoll & Rooney PC (57) ABSTRACT

An image analysis processing system includes: a plurality of image forming apparatuses including an image former; an image reader that reads an image formed on a recording medium; an analysis adjuster capable of performing adjustment on the image former by obtaining printing information on the recording medium and analyzing the printing information; and an adjustment timing determiner that obtains information regarding usage status in the image forming apparatus having been subject to the adjustment, determines, at least on the basis of the information regarding the usage status, a timing for performing adjustment on another predetermined image forming apparatus incapable of performing the adjustment on the basis of a result of analysis of the printing information, and transmits information regarding the timing to the predetermined image forming apparatus, the image forming apparatus, the image reader, the analysis adjuster, and the adjustment timing determiner being connected to a network.

20 Claims, 10 Drawing Sheets

IMAGE ANALYSIS PROCESSING SYSTEM WITH ANALYSIS ADJUSTER, MANAGEMENT APPARATUS, IMAGE PROCESSING APPARATUS, AND PROGRAM

The entire disclosure of Japanese patent Application No. 2018-089729, filed on May 8, 2018, is incorporated herein by reference in its entirety.

BACKGROUND

Technological Field

The present invention relates to an image analysis processing system, a management apparatus, an image processing apparatus, and a program, which are connected to a network and are capable of controlling image quality adjustment in a plurality of image forming apparatuses including an image former.

Description of the Related Art

In the field of an image forming apparatus such as a copier, a printer, and a multifunction peripheral, there has been known an apparatus having a function of performing image quality adjustment and the like using image reading data obtained by reading an image on a paper sheet. For example, gradation, maximum density, edge quality, a line width, and color misalignment are analyzed according to a result of printing a chart on a paper sheet and reading the printed chart. When image quality of an output object is determined to be lowered as a result, image quality adjustment, machine adjustment, and the like are performed.

The function described above requires a configuration in which an image is read and analyzed. Therefore, in a system in which a plurality of image forming apparatuses are connected to a network, there are an image forming apparatus capable of executing the function above and an image forming apparatus incapable of executing the function above, depending on the presence or absence of the configuration above.

In JP 2014-135693 A, there is disclosed a technique in which a server collects information associated with a result of calibration of an apparatus including a scanner and information associated with a result of calibration of an apparatus that does not include a scanner and has low precision to increase adjustment accuracy.

Further, JP 2008-277999 A discloses a technique of adjusting, in a system requiring adjustment values to be adjusted with a specific apparatus like tandem printing, an adjustment timing with the specific apparatus.

According to a conventional technique, when an image reader reads an image of an output object and performs real-time analysis to find a blur of the output object or a decrease in toner density, adjustment operation of an image forming apparatus is performed, whereby deterioration in image quality of the output object can be suppressed. However, in the case of an image forming apparatus not including the image reader and the analysis function, an appropriate adjustment timing cannot be found in real time. Moreover, according to the conventional technique, the appropriate adjustment timing cannot be obtained in an apparatus having no specific relation such as tandem printing. In view of the above, conventionally, the image forming apparatus performs adjustment at a predetermined timing determined in advance, which may have a problem that waste printed sheets are generated and wasteful consumption of toner and paper sheets occur due to unnecessary adjustment.

SUMMARY

The present invention has been conceived in view of the circumstances described above, and an object of the present invention is to provide an image analysis processing system, a management apparatus, and an image processing apparatus, which are capable of determining an adjustment timing and notifying an image forming apparatus that is in a network and cannot perform adjustment on the basis of a result of analysis of printing information of the appropriate adjustment timing.

To achieve the abovementioned object, according to an aspect of the present invention, an image analysis processing system reflecting one aspect of the present invention comprises: a plurality of image forming apparatuses including an image former; an image reader that reads an image formed on a recording medium by the image former; an analysis adjuster capable of performing adjustment on the image former by obtaining printing information on the recording medium read by the image reader and analyzing the printing information; and an adjustment timing determiner that obtains information regarding usage status in the image forming apparatus having been subject to the adjustment, determines, at least on the basis of the information regarding the usage status, a timing for performing adjustment on another predetermined image forming apparatus incapable of performing the adjustment on the basis of a result of analysis of the printing information, and transmits information regarding the timing to the predetermined image forming apparatus, the image forming apparatus, the image reader, the analysis adjuster, and the adjustment timing determiner being connected to a network.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
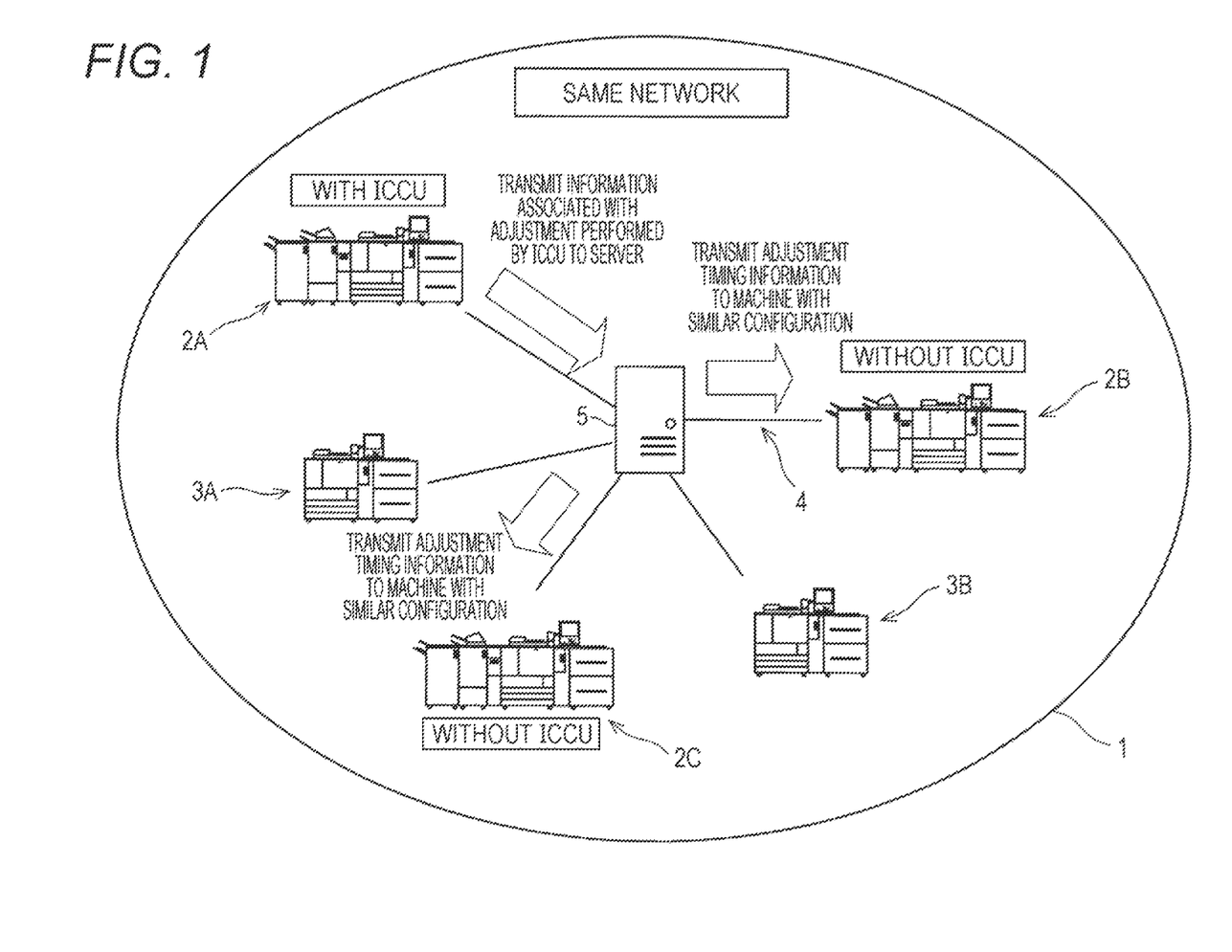
FIG. 1 is a schematic diagram illustrating an image analysis processing system according to an embodiment of the present invention.

In an image forming system 1 in FIG. 1, a plurality of image forming apparatuses 2A, 2B, 2C, 3A, and 3B, and a server 5 are connected to the same network 4.

The image forming apparatus 2A includes an image forming apparatus main body including an image former, and a reading apparatus (hereinafter referred to as image calibration control unit (ICCU) as appropriate) that is mechanically connected to the image forming apparatus main body and reads an image of an output object on which an image is formed by the image forming apparatus main body.

With this reading apparatus, an image for comparison is obtained to be compared with the read image in which the output object is read by the image reader, whereby gradation, maximum density, edge quality, a line width, color misalignment, and the like can be analyzed. As a result, when the image quality of the output object is determined to be lowered, it is possible to instruct the image forming apparatus main body to perform image quality adjustment, machine adjustment, and the like. Examples of the image for comparison include an image for printing, a correct answer image, and a chart screen. The operation of the reading apparatus described above can be performed by, for example, a reading controller included in the reading apparatus. In this mode, the reading controller corresponds to an analysis adjuster. Note that the reading apparatus may be controlled to directly perform adjustment on the image forming apparatus main body. The reading apparatus mentioned above corresponds to an image processing apparatus according to the present invention.

Besides, adjustment of the image former may be performed by the image controller in response to a result of analysis of the reading apparatus, and a usage status for the image forming apparatus may be transmitted to a server in the image controller. In that case, the reading controller and the image controller cooperate to function as the analysis adjuster.

Further, a result of reading of the reading apparatus is transmitted to the image forming apparatus main body or the server, and the image controller included in the image forming apparatus main body, a management controller of the server, and the like compare the read image with the image for comparison to analyze the gradation, maximum density, edge quality, line width, color misalignment and the like. As a result, when the image quality of the output object is determined to be lowered, it is possible to instruct the image forming apparatus main body to perform image quality adjustment, machine adjustment, and the like. Furthermore, the management controller may directly control the adjustment in the image forming apparatus. When analysis or the like is performed by the image controller or the management controller, the image controller and the management controller function as an analysis adjuster. In the mode described above, the server functions as a management apparatus.

No reading apparatus is incorporated or connected to the image forming apparatuses 2B, 2C, 3A, and 3B so that the image of the output object cannot be read. In addition, the image forming apparatuses 2B and 2C are set in the server as an apparatus similar to the image forming apparatus 2A on the basis of one or more pieces of apparatus information of model information, supply tray information, and information obtained by an internal sensor. On the other hand, the image forming apparatuses 3A and 3B are not similar to the image forming apparatus 2A, and are not set as described above. Note that a user may set whether the apparatus is similar, or it may be automatically determined and set whether the apparatus is similar on the basis of apparatus information such as model information of the image forming apparatus to which the management controller is connected.

When the adjustment such as the image quality adjustment of the image forming apparatus 2A is performed, the analysis adjuster transmits, to the server, at least a usage status in the image forming apparatus 2A at the time of performing the adjustment. The server obtains the usage status with the management controller, and determines a timing to perform adjustment on the image forming apparatuses 2B and 2C, which are other predetermined image forming apparatuses incapable of performing the adjustment on the basis of a result of analysis of printing information, at least on the basis of the information associated with the usage status. Moreover, the management controller transmits information associated with the timing to a predetermined image forming apparatus. Therefore, in this mode, the management controller functions as an adjustment timing determiner. In addition to the usage status, the apparatus information and the adjustment content may be transmitted as information to be transmitted from the image forming apparatus 2A to the server.

The usage status may be one or more of the number of output sheets of a recording medium in the image forming apparatus 2A, an amount of toner used, and a usage status of parts. There is no particular limitation on which element is used as the usage status. In this mode, another predetermined image forming apparatus is set as an apparatus similar to the image forming apparatus 2A. An appropriate criterion as to whether it is similar can be used. It can be determined on the basis of whether component parts are similar, for example.

The information transmitted from the management controller to the predetermined image forming apparatus may be timing information itself, or may be information that can determine the timing (e.g., after a predetermined number of sheets are output). Further, with regard to the transmission time, it may be transmitted immediately after the timing is determined, or may be transmitted at appropriate time such as time close to the timing.

Figure 2:
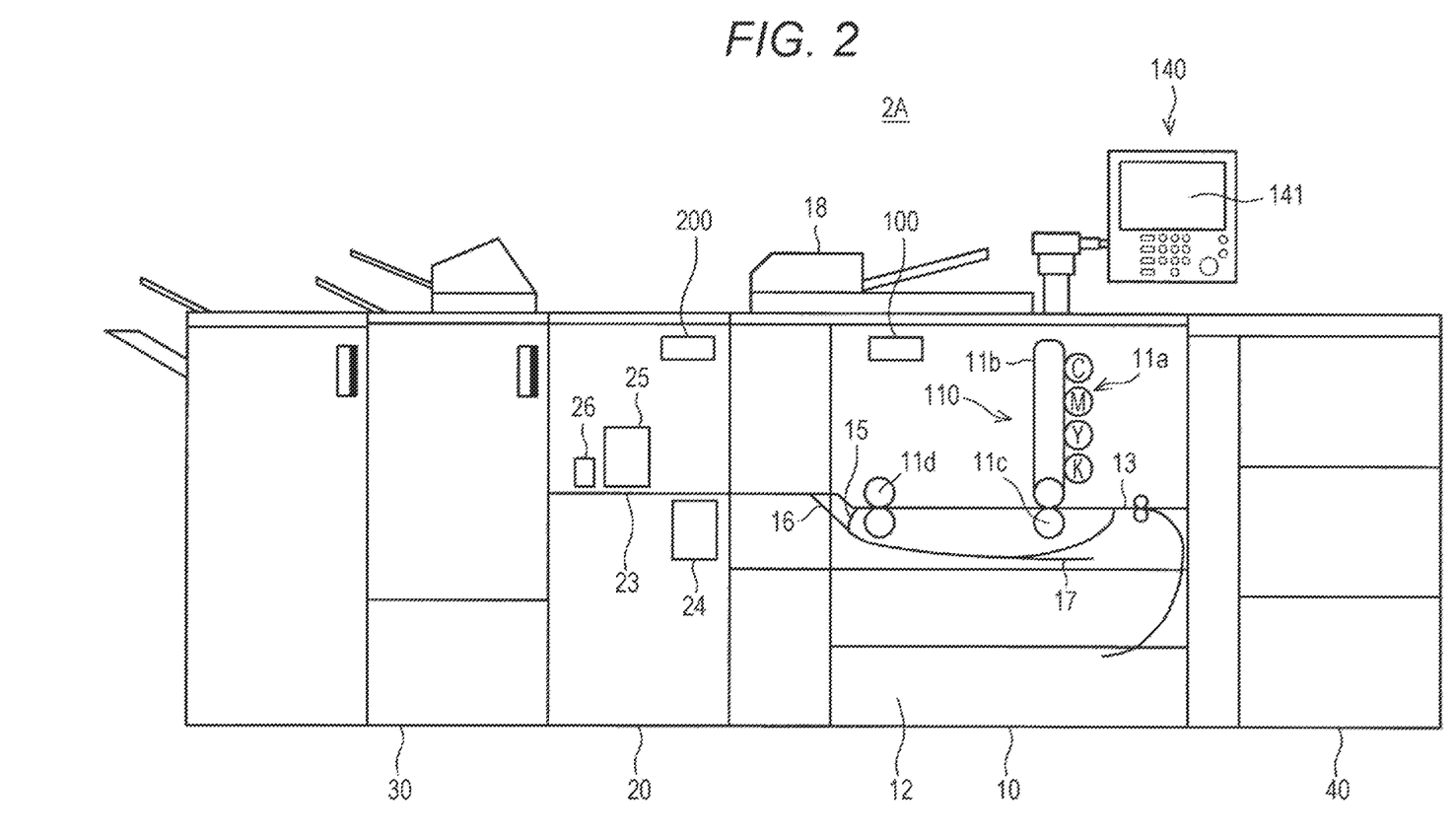
FIG. 2 is a diagram illustrating a mechanical outline of an image forming apparatus included in an embodiment.

Next, a schematic mechanical configuration of the image forming apparatus 2A will be described with reference to FIG. 2.

The image forming apparatus 2A includes an image forming apparatus main body 10 that forms an image, and includes a sheet feeding apparatus 40 at the precedent stage thereof. A reading apparatus 20 is included at the subsequent stage of the image forming apparatus main body 10, and a post-processing apparatus 30 is included at the subsequent stage of the reading apparatus 20. Each apparatus and the image forming apparatus main body are electrically and mechanically connected, and communication and paper sheet conveyance can be performed between each apparatus and the image forming apparatus main body.

The sheet feeding apparatus 40 includes a plurality of paper feed stages for storing paper sheets, and the paper sheets stored in the paper feed stage can be supplied to the image forming apparatus main body 10 at the subsequent stage. The paper sheet corresponds to the recording medium according to the present invention. Note that the material of the recording medium is not limited to paper in the present invention, and may be cloth, plastic, or the like.

The image forming apparatus main body 10 includes a main body sheet feeder 12 including a plurality of sheet feeding trays on the lower side in the housing. Paper sheets are stored in each sheet feeding tray in the main body sheet feeder 12. The paper sheet corresponds to the recording medium according to the present invention. The material of the recording medium is not limited to paper, and may be cloth or plastic.

A conveying path 13 is provided in the housing of the image forming apparatus main body 10, and paper sheets supplied from the sheet feeding apparatus 40 or the main body sheet feeder 12 are conveyed downstream along the conveying path 13.

An image former 110 that forms an image on a paper sheet is provided near the middle of the conveying path 13.

The image former 110 includes a photoreceptor 11a for each color (cyan, magenta, yellow, and black), and a charger, a laser diode (LD), a developing device, a cleaner, and the like (not illustrated) are provided around the photoreceptor 11a. The image former 110 further includes an intermediate transfer belt 11b at a position where it comes into contact with the photoreceptor 11a for each color. The intermediate transfer belt 11b contacts, at a secondary transfer part 11c provided midway therein, the paper sheet on the conveying path 13. Further, the conveying path 13 is provided with a fuser 11d at a position on the downstream side of the secondary transfer part 11c.

When an image is formed on a paper sheet, the photoreceptor 11a is uniformly charged by the charger, and then the LD irradiates the photoreceptor 11a with laser light, thereby forming a latent image on the photoreceptor 11a. The latent image on the photoreceptor 11a is developed by the developing device to be a toner image. The toner image on the photoreceptor 11a is transferred to the intermediate transfer belt 11b, and the image on the intermediate transfer belt 11b is transferred to the paper sheet at the secondary transfer part 11c. The paper sheet on which the image is formed, which is conveyed along the conveying path 13, is subject to fixing of the image performed by the fuser 11d.

Although the image former 110 has been described to perform multicolor image formation in the present embodiment, the image former 110 may perform image formation in a single color, such as monochrome, according to the present invention.

A reverse conveying path 15 branches off from the conveying path 13 on the downstream side of the fuser 11d. A downstream conveying path 16 branches off from the reverse conveying path 15 midway, and is connected to the conveying path 13 on the downstream side of the branching point of the reverse conveying path 15. A withdrawal conveying path 17 branches off from the reverse conveying path 15 on the downstream side of the point at which the downstream conveying path 16 branches off. The downstream end of the reverse conveying path 15 joins the conveying path 13 at a position on the upstream side of the image former 110. The conveying path 13 is connected to a conveying path 23 of the reading apparatus 20 connected to the subsequent stage in the straight direction.

When an image is formed on one side of the paper sheet, the paper sheet after the image formation is conveyed straight to, through the conveying path 13, the conveying path 23 of the reading apparatus 20.

When the face side of the paper sheet is switched after the image formation, the paper sheet is conveyed to the reverse conveying path 15, conveyed beyond the branching point of the downstream conveying path 16, then conveyed on the reverse conveying path 15 in the reverse direction, and then conveyed to the downstream side of the conveying path 13 through the downstream conveying path 16.

When an image is formed on the back surface of the paper sheet by reversing the paper sheet, the paper sheet is sent from the conveying path 13 to the reverse conveying path 15, sent to the withdrawal conveying path 17, then the front and rear ends of the paper sheet are changed to be sent to the downstream side of the reverse conveying path 15, and then circulated to the conveying path 13. Thereafter, an image is formed on the back surface of the paper sheet by the image former 110.

An operation unit 140 is provided at an upper part of the housing of the image forming apparatus main body 10. The operation unit 140 includes a liquid crystal display (LCD) 141 provided with a touch panel, and a group of operation keys such as a numeric keypad, which enables display of information and reception of operation input. The operation unit 140 corresponds to a display, and also serves as an operation unit.

Although the operation unit and the display are integrated to serve as the operation unit 140 in the present embodiment, the operation unit and the display may not necessarily be integrated, and for example, the operation unit may be composed of a mouse, a tablet, a terminal, or the like. Besides, the LCD 141 may be movable.

An automatic document feeder (ADF) 18 is provided at an upper part of the housing of the image forming apparatus main body 10 where the operation unit 140 is not positioned. The ADF 18 automatically feeds a document set on a document platen, and a scanner reads the document fed by the ADF 18.

The document may be read on a platen glass (not illustrated). The printed matter output from the image forming apparatus main body 10 may be set and read in the scanner. For example, the paper sheet output from the image forming apparatus main body 10 may be set and read, and the image formed on the paper sheet may be read. In that case, the scanner can function as an image reader.

The image forming apparatus main body 10 includes an image controller 100. The image controller 100 controls the entire image forming apparatus, and may include a CPU, a program to operate in the CPU, a memory, and the like. Note that the image controller 100 may be provided outside the image forming apparatus main body.

The reading apparatus 20 includes the conveying path 23, and the paper sheet introduced from the image forming apparatus main body 10 is conveyed along the conveying path 23. The paper sheet may be discharged straight on the downstream side of the conveying path 23, or may be conveyed to the post-processing apparatus in the subsequent stage.

The conveying path 23 is provided with, near the middle thereof, a reading sensor 24 that reads an image on the lower surface of the paper sheet conveyed through the conveying path 23, and a reading sensor 25 that reads an image on the upper surface of the paper sheet, and the reading sensor 24 is positioned on the upstream side of the reading sensor 25 in the sheet conveying direction. Besides, on the downstream side of the reading sensor 25, there is provided a colorimeter 26 that performs colorimetry on the image on the upper surface of the paper sheet.

The reading sensors 24 and 25 can be composed of a charge-coupled device (CCD) sensor, a complementary metal-oxide-semiconductor (CMOS) sensor, or the like, and are capable of reading the image on the paper sheet conveyed through the conveying path 23 across the entire direction crossing the conveying direction. Results of the reading performed by the reading sensors 24 and 25 and the colorimeter 26 are transmitted to a reading controller 200 included in the reading apparatus 20. The reading sensors 24 and 25 and the colorimeter 26 are included in the image reader according to the present invention. The reading controller 200 may include a CPU, a program to operate in the CPU, a memory, and the like. Note that the reading controller 200 may be provided outside the image forming apparatus main body. As described above, the reading controller 200 functions as an analysis adjuster.

Although the images on the front and back surfaces of the paper sheet are read by the two reading sensors in the descriptions above, a reverse conveying path may be provided in the precedent and subsequent stages of the reading sensor, and reversal conveyance of the paper sheet may be performed, thereby reading the images on the front and back surfaces of the paper sheet with one reading sensor.

Further, although the in-line mechanical connection is performed between the reading apparatus and the image forming apparatus main body in the present embodiment, the reading apparatus may not be mechanically connected to the image forming apparatus. The result of the reading may be transmitted to the image controller on the basis of connection using a communication line or a network, or data may be transferred via a movable storage medium.

Moreover, the reading sensors 24 and 25 are installed in the reading apparatus 20 in the present embodiment, the reading sensor may be installed in the image forming apparatus main body 10, for example. The reading apparatus may not be mechanically connected to the image forming apparatus. Even if it is mechanically offline, the function as the present invention can be implemented as long as the result of the reading can be obtained.

The post-processing apparatus 30 is connected at the subsequent stage of the reading apparatus 20, and it is possible to discharge the paper sheet after performing desired post-processing, or to discharge the paper sheet straight without performing post-processing.

Although analysis of the image and determination of adjustment with respect to the image former are performed in the reading controller 200 on the basis of the read image read by the reading apparatus 20 in the present embodiment, the read image read by the reading sensors 24 and 25 may be transferred to the image controller 100, and the analysis of the read image and the determination of adjustment may be performed in the image controller 100. The method of determining whether adjustment of the image former can be performed is not limited to a specific method in the present invention.

Although the image forming apparatus 2A includes the sheet feeding apparatus 40, the image forming apparatus main body 10, the reading apparatus 20, and the post-processing apparatus 30 in the present embodiment, the number and the type of the apparatuses included in the image forming apparatus according to the present invention are not limited to the above, and the image forming apparatus may include only the image forming apparatus main body 10. In that case, the image reader exists outside the image forming apparatus. In addition to the sheet feeding apparatus 40, the image forming apparatus main body 10, and the reading apparatus 20, another apparatus may be included.

Figure 3:
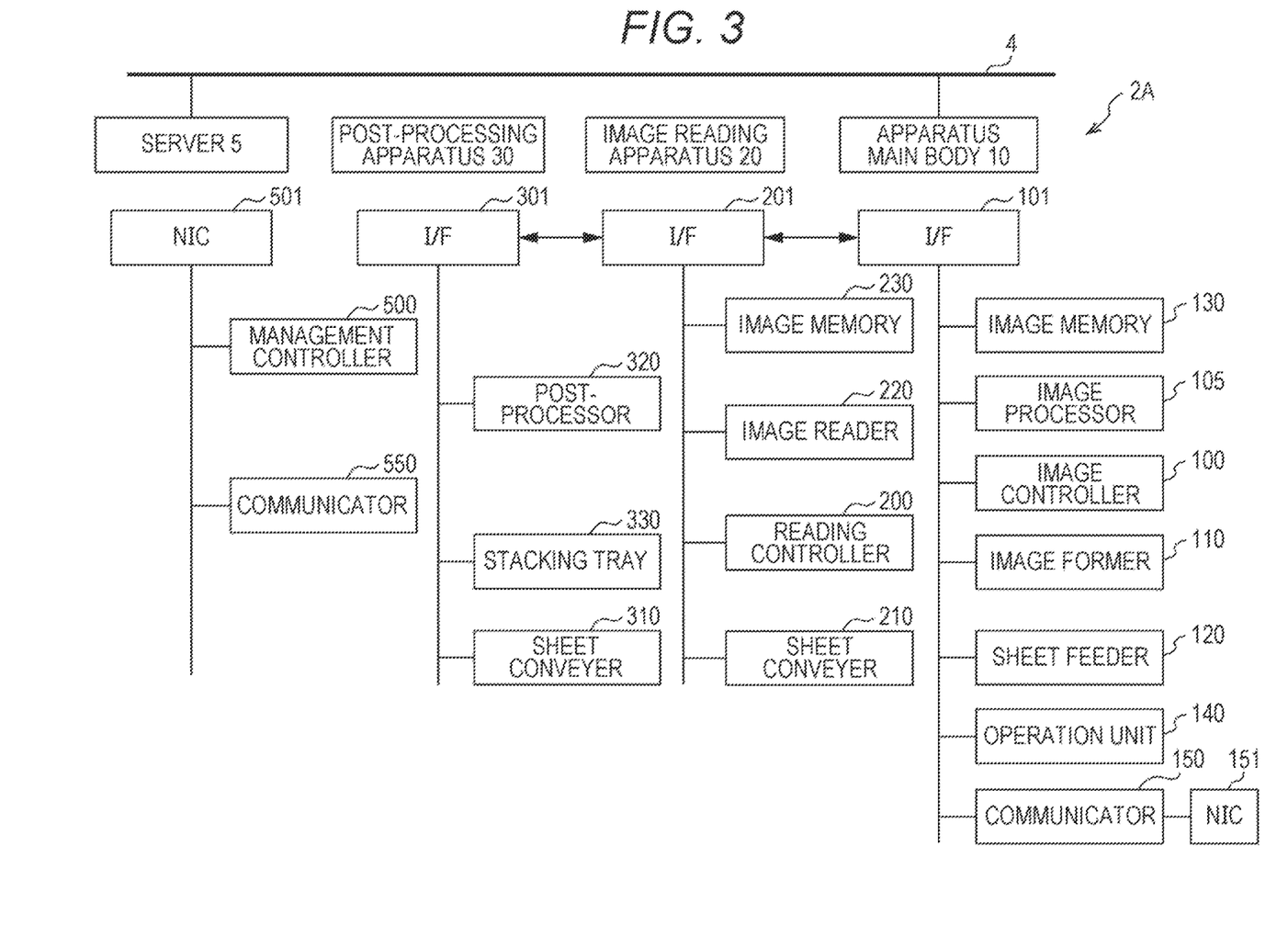
FIG. 3 is a diagram illustrating control blocks of the image analysis processing system.

Next, control blocks of a part of an analysis processing system will be described with reference to FIG. 3.

The image forming apparatus main body 10 includes an interface 101 that performs communication with a connected apparatus, and in the image forming apparatus main body 10, it is connected to an interface 201 of the reading apparatus 20.

The image forming apparatus main body 10 includes the image controller 100 that controls the entire image forming apparatus, and an image processor 105 is connected to the image controller 100. The image processor 105 performs image processing such as reading of image data and writing of an image.

At the time of writing an image, various kinds of image processing can be applied, such as rotation, enlargement, reduction of the image, addition of a page number, layout processing such as page summarization, thinning processing, density correction processing, and halftone processing for simulating halftone.

The image former 110 is controllably connected to the image controller 100, and is capable of forming an image on the paper sheet on the basis of read image data, raster image processor (RIP) data, a chart image for adjustment, and the like.

The image data can be temporarily stored in an image memory 130, and can be used for image formation.

A sheet feeder 120 feeds a paper sheet to the image former 110, and includes the main body sheet feeder 12.

The operation unit 140 is capable of receiving operation input made by the user, and is capable of displaying information, for example. The operation unit and the display may be shared by a touch panel provided on the LCD, or the like.

A communicator 150 is capable of communicating with a device connected to the network 4 via a network interface card (NIC) 151, and is capable of transmitting/receiving information to/from the server 5, for example.

The reading apparatus 20 includes the interface 201 that communicates with the interface 101 of the image forming apparatus main body 10 and further communicates with the interface of the post-processing apparatus 30 at the subsequent stage.

The reading apparatus 20 includes the reading controller 200 that controls the reading apparatus 20, and is capable of controlling operation of the reading apparatus 20 according to a control command from the image controller 100. The reading controller 200 includes a CPU, a program to operate in the CPU, a storage, and the like.

The image read by the reading apparatus 20 can be analyzed by the reading controller 200.

A sheet conveyer 210 is controllably connected to the reading controller 200, which conveys the paper sheet sent from the image forming apparatus main body 10 through the conveying path 23 in an image-readable manner, and further conveys the paper sheet to the subsequent stage.

An image reader 220 is connected to the reading controller 200 in a controllable manner. The image reader 220 includes the reading sensors 24 and 25. The result of reading read by the image reader 220 is temporarily sent to the reading controller 200 to be determined straight, or transmitted to the image controller 100 to be determined by the image controller 100.

An image memory 230 is additionally connected to the reading controller 200 in a controllable manner. The result of reading read by the image reader 220 is stored in the image memory 230. The image memory 230 may not be provided in the reading apparatus 20, and the result of reading may be stored in an image memory provided in the image forming apparatus main body 10.

The post-processing apparatus 30 includes an interface 301 that communicates with the interface 201 of the reading apparatus 20.

A post-processor 320 is provided in the post-processing apparatus 30, and desired post-processing can be performed in the post-processor 320. The post-processing apparatus 30 is capable of discharging paper sheets without performing post-processing.

The server 5 connected to the network 4 via an NIC 501 and a communicator 550 includes a management controller 500. The management controller 500 is capable of managing the entire server 5, and of transmitting/receiving information to/from the image forming apparatus via the network 4.

For example, when adjustment is performed in the image forming apparatus 2A according to the result of reading of the image, it obtains a usage status of the image forming apparatus 2A. At this time, although the apparatus information of the image forming apparatus 2A may be obtained, it is possible to obtain the apparatus information of each image forming apparatus in advance. Further, time management controller 500 can obtain the adjustment content together with the usage status.

As described above, the management controller 500 determines the adjustment timing in the image forming apparatus having configuration similar to that of the image forming apparatus 2A on the basis of the usage status of the image forming apparatus 2A. Although time adjustment timing may be determined according to the usage status of the image forming apparatus 2A, it is possible to determine the adjustment timing in consideration of the device configuration of another similar image forming apparatus.

Information associated with the determined adjustment timing is transmitted to a target image forming apparatus at appropriate time. The image forming apparatus that has received the adjustment timing can perform adjustment according to the adjustment timing. The adjustment may be performed at a timing different from the received adjustment timing depending on conditions, such as setting in the image forming apparatus.

Although the server receives the usage status and the like of the image forming apparatus 2A at the time of performing the adjustment to determine the adjustment timing and to transmit the adjustment timing to the image forming apparatus in time embodiment described above, time usage status and the like may be obtained by the image forming apparatus 2A to determine the adjustment timing and to transmit the adjustment timing to another image forming apparatus. In this mode, the image controller of the image forming apparatus 2A functions as an adjustment timing determiner. Further, a similar function may be implemented by an image forming apparatus other than the image forming apparatus 2A. The image forming apparatus 2A in this mode has a function as the image processing apparatus according to the present invention.

Figure 4:
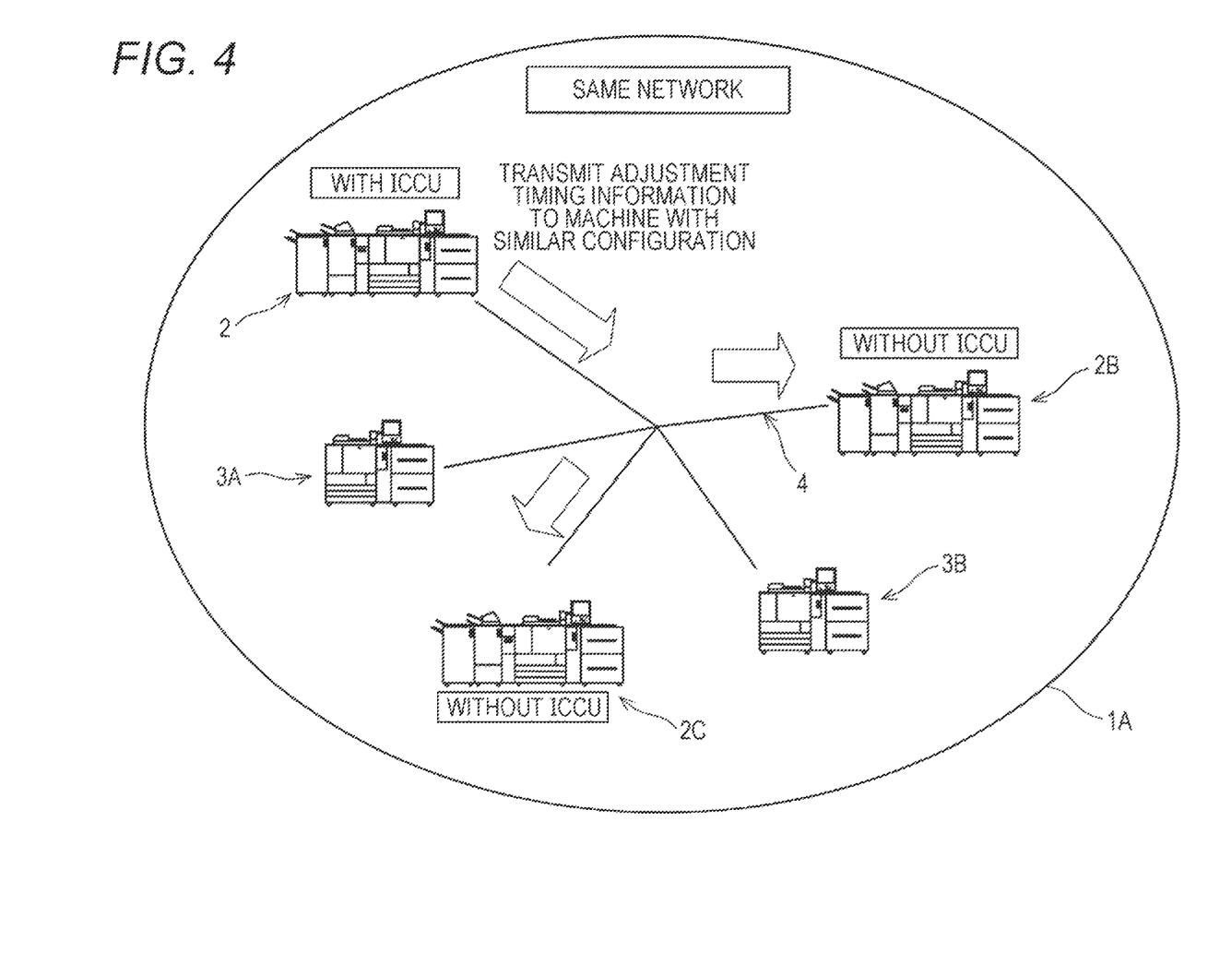
FIG. 4 is a schematic diagram illustrating an image analysis processing system according to another embodiment of the present invention.

FIG. 4 illustrates an image forming system having the configuration described above. An image forming apparatus 2 including an image reader is connected to the network 4, and the image forming apparatuses 2B and 2C similar to the image forming apparatus 2 are recorded in the image forming apparatus 2.

The image forming apparatus 2 is capable of obtaining printing information of an output object using the read image read by the image reader. Adjustment for an image former included in the image forming apparatus 2 can be performed by analyzing the printing information. Therefore, an image controller of the image forming apparatus 2 functions as an analysis adjuster. Further, the image controller obtains a usage status and adjustment content at the time of performing the adjustment, and determines an adjustment timing for the image forming apparatuses 2B and 2C, which are regarded to be similar to the image forming apparatus 2. Information associated with the timing is transmitted to the image forming apparatuses 2B and 2C at appropriate time. Therefore, the image controller functions as an adjustment timing determiner.

Furthermore, operation of the analysis adjuster and the adjustment timing determiner may be executed by an image controller of an image forming apparatus other than the image forming apparatus 2.

Next, a procedure for determining the adjustment timing and transmitting it to another apparatus will be described.

Figure 5:
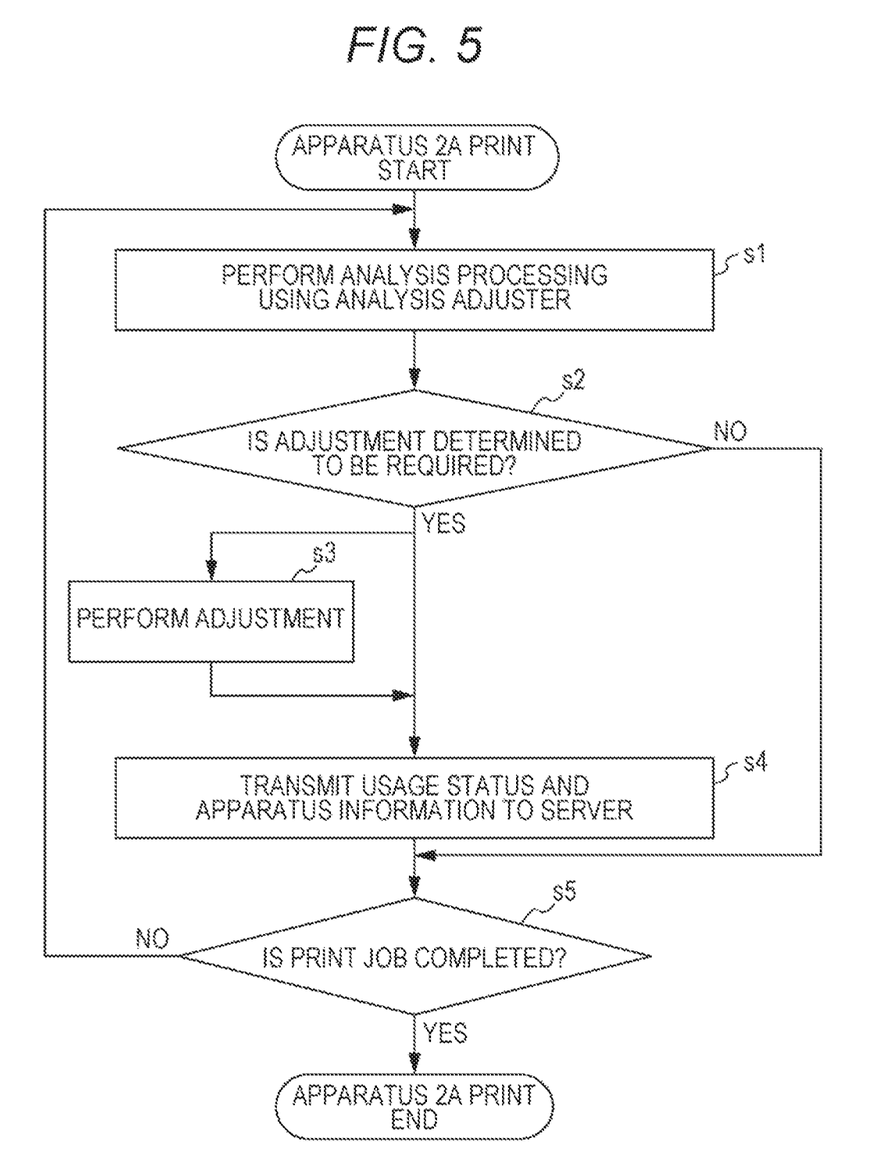
FIG. 5 is a flowchart illustrating a procedure of transmitting a usage status and the like from an image forming apparatus that has performed adjustment to a server.

First, a procedure from the execution of adjustment performed by the image forming apparatus 2A to the transmission of information to the server will be described on the basis of the flowchart of FIG. 5. The following procedure is executed by the control of the image controller.

The image forming apparatus 2A starts printing, and the analysis adjuster performs analysis processing on the basis of the result of reading of the output object performed by the image reader (step s1). As a result of the analysis, it is determined whether adjustment is required on the basis of blurring of the output object, a decrease in toner density, and the like (step s2). Note that a criterion for the case where the adjustment is required may be defined in advance.

When the adjustment is not required as a result of the analysis (No in step s2), the process proceeds to step s5, and, it is determined whether a print job is complete. When the print job is complete (Yes in step s5), printing in the image forming apparatus 2A is terminated.

When it is determined that the adjustment is required as a result of the analysis (Yes in step s2), adjustment processing is performed (step s3), and a usage status, apparatus information, and the like at the time of performing the adjustment are transmitted to the server (step s4). Next, it is determined whether the print job is complete (step s5). When the print job is incomplete (No in step s5), the process returns to step s1, and the subsequent steps are repeated. When the print job is complete (Yes in step s5), the procedure is terminated.

Figure 6:
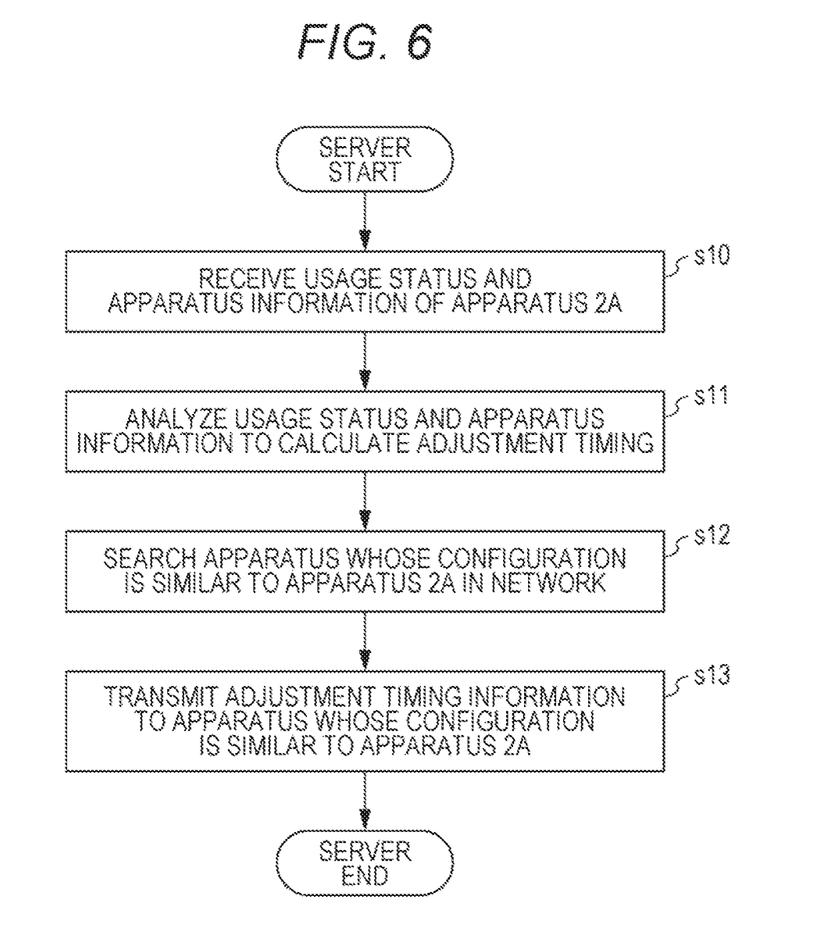
FIG. 6 is a flowchart illustrating a procedure of determining an adjustment timing using the server that has received the usage status and the like and transmitting adjustment timing information to another predetermined image forming apparatus.

Next, operation of the server that has received the information from the image forming apparatus 2A will be described on the basis of the flowchart of FIG. 6. The following procedure is executed by the control of the management controller.

A usage status, apparatus information, and the like of the image forming apparatus 2A are received (step s10), and, the usage status, the apparatus information, and the like are analyzed to calculate an adjustment timing (step s11). Next, an apparatus having a configuration similar to that of the image forming apparatus 2A in the network is searched (step s12). The adjustment timing information is transmitted to the searched apparatus having the configuration similar to that of the image forming apparatus 2A (step s13), and the procedure is terminated.

Figure 7:
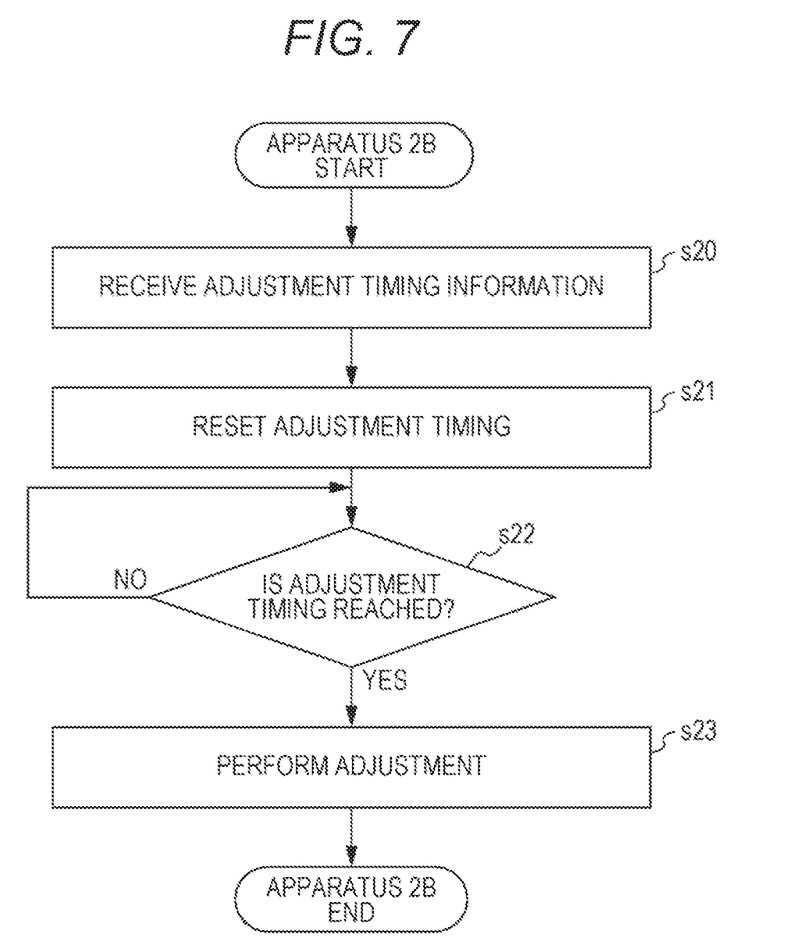
FIG. 7 is a flowchart illustrating a procedure of performing adjustment using the other image forming apparatus that has received the adjustment timing information.

Operation performed by the image forming apparatus 2B having the configuration similar to that of the image forming apparatus 2A, which is performed by receiving the adjustment timing, will be described on the basis of the flowchart of FIG. 7. The following procedure is executed by the control of the image controller included in the image forming apparatus 2B.

The adjustment timing information is received from the server (step s20), and an adjustment timing of its own apparatus is reset on the basis of the received information (step s21). Next, it is determined whether the adjustment timing is reached (step s22). When the adjustment timing is not reached (No in step s22), it waits until the adjustment timing is reached. When the adjustment timing is reached (Yes in step s22), the adjustment is performed (step s23), and the procedure is terminated.

According to the procedure described above, in the case where, in a system including, in the same network, a plurality of image forming apparatuses and a server for collecting various kinds of data transmitted from the image forming apparatuses, the image forming apparatus including a reading apparatus and the apparatus not including a reading apparatus mixedly exist, the image forming apparatus including the reader (image forming apparatus 2A) can perform real-time analysis on an output object to detect blurring of the output object and a decrease in density, and can perform various kinds of adjustment as necessary to confirm that the output object is being normally output again.

At this time, the image forming apparatus 2A can transmit, to the server in the network, the number of printed sheets, the amount of consumed toner, and whether the effect of the adjustment is exerted, for example, before performing the adjustment. The server accumulates this data and calculates a timing to perform adjustment. Thereafter, the information associated with the timing to perform adjustment is transmitted to another image forming apparatus (e.g., image forming apparatus 2B) having a configuration similar to that of the image forming apparatus 2A in the network. The configuration here refers to a model, a toner consumption status, information associated with paper sheets on the sheet feeding tray, information from an internal sensor as standard equipment, and the like. Upon reception of the information mentioned above, the image forming apparatus 2B can reset the timing at winch the next adjustment should be performed on the basis of the current usage status.

Accordingly, the adjustment timing performed on the basis of the information obtained by the reading apparatus can also be applied to another apparatus including no reading apparatus so that the adjustment can be performed at appropriate time to a certain extent, though not accurately, whereby unnecessary adjustment and a delay in adjustment can be suppressed.

Figure 8:
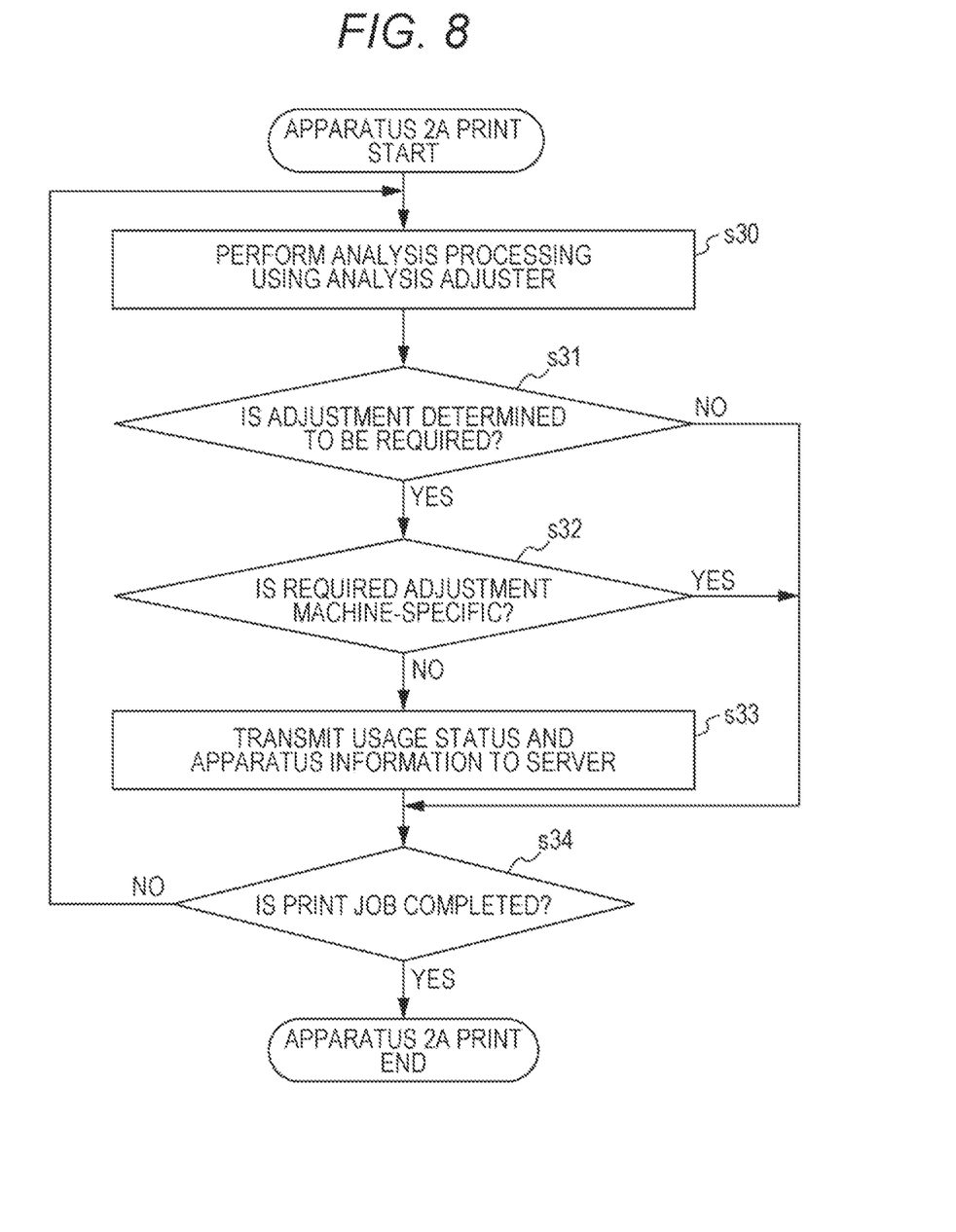
FIG. 8 is a flowchart illustrating a procedure of an image forming apparatus in which processing differs depending on whether the adjustment is machine-specific adjustment.

Next, another mode in which processing differs depending on whether the adjustment content performed by the image forming apparatus 2A is machine-specific will be described on the basis of the flowchart of FIG. 8. The following procedure is executed by the control of the image controller of the image forming apparatus 2A.

First, analysis processing is performed by the analysis adjuster on the basis of the read image obtained by reading the image (step s30). It is determined whether adjustment is required from a result of the analysis (step s31). When the adjustment is not required (No in step s1), the process proceeds to step s34, and it is determined whether the print job is complete.

When it is determined that the adjustment is required (Yes in step s31), it is then determined whether the required adjustment is machine-specific (step s32). Examples of the machine-specific adjustment include adjustment at the time of detection of waste printed sheets caused by scratches on a drum or the like, and adjustment based on deviation of a printing position.

When the required adjustment is machine-specific (Yes in step s32), the process proceeds to step s34, and it is determined whether the print job is complete.

When the required adjustment is not machine-specific (No in step s32), a usage status, apparatus information, and the like are transmitted to the server (step s33), and then it is determined whether the print job is complete (step s34).

When the print job is complete (Yes in step s34), printing in the image forming apparatus 2A is terminated. When the print job is incomplete (No in step s34), the process returns to step s30, and the analysis processing and the subsequent steps are repeated.

The processing procedure of the image forming apparatus having a configuration similar to that of the image forming apparatus 2A and the server that has obtained the information that the adjustment is not machine-specific is similar to the procedure according to the mode described above.

According to the procedure described above, when it is determined that the adjustment of the image forming apparatus 2A is machine-specific, information is not transmitted to the server. Alternatively, information indicating that the adjustment is machine-specific is transmitted together so that the server does not transmit the adjustment timing to another apparatus.

According to the mode described above, unnecessary adjustment performed by the other apparatus that does not analyze the read image can be suppressed.

Figure 9:
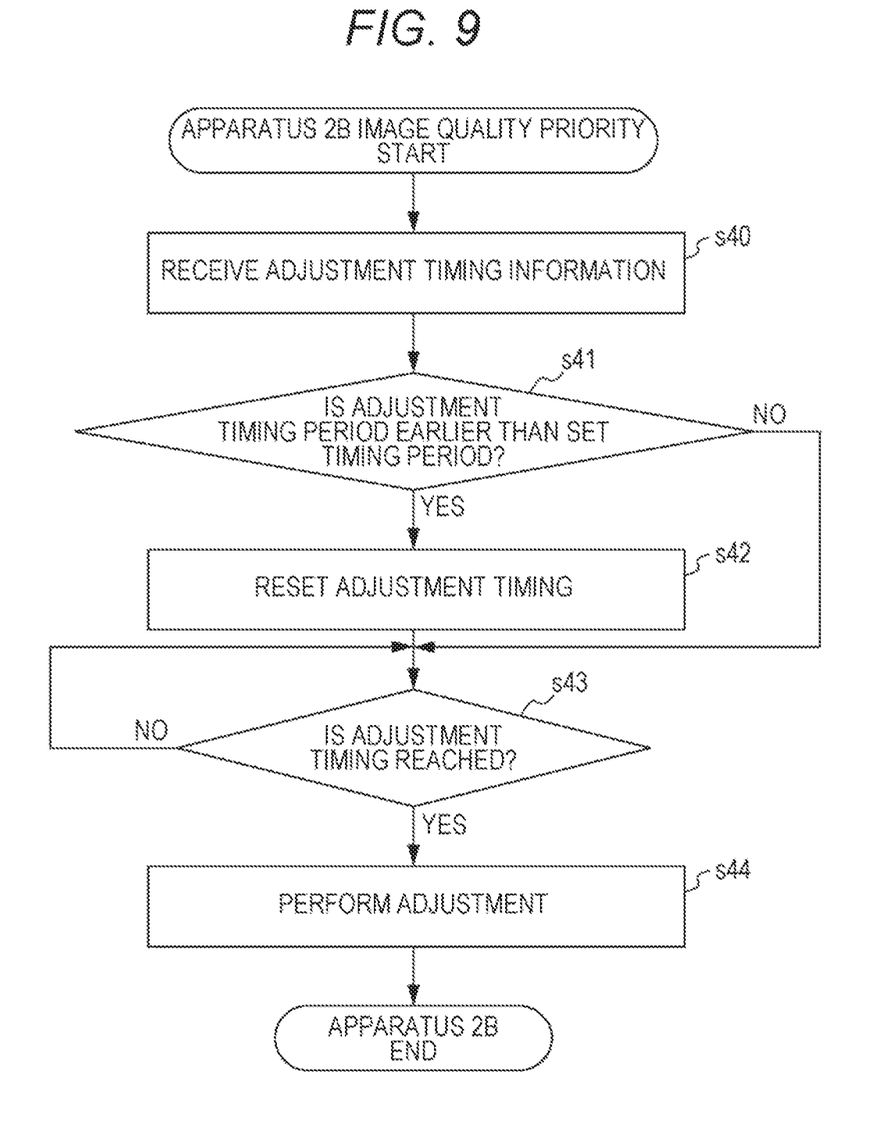
FIG. 9 is a flowchart illustrating a procedure of the adjustment using the other image forming apparatus in which image quality priority is set.

Next, a procedure for performing processing according to time setting related to the adjustment which is performed by the image forming apparatus that has received time information associated with the adjustment timing will be described on the basis of the flowchart of FIG. 9. Note that the following procedure is executed by the control of the image controller of the image forming apparatus 2B that receives the adjustment timing information.

In the image forming apparatus 2B, image quality priority is set in advance as an adjustment timing. Note that server instruction priority may be selected depending on the setting.

The image forming apparatus 2B receives the adjustment timing information from the server (step s40), and it is determined whether the received adjustment timing period is earlier than the set timing period (step s41).

When the received adjustment timing period is not earlier than the set timing period (No in step s41), it is determined whether the set adjustment timing is reached (step s43). When the received adjustment timing period is earlier than the set timing period (Yes in step s41), an adjustment timing is reset (step s42), and it is determined whether time set adjustment timing is reached (step s43).

When the adjustment timing is not reached in step s43 (No in step s43), it waits until the adjustment timing is reached.

When the adjustment timing is reached (Yes in step s43), the adjustment is performed (step s44), and the procedure is terminated.

Figure 10:
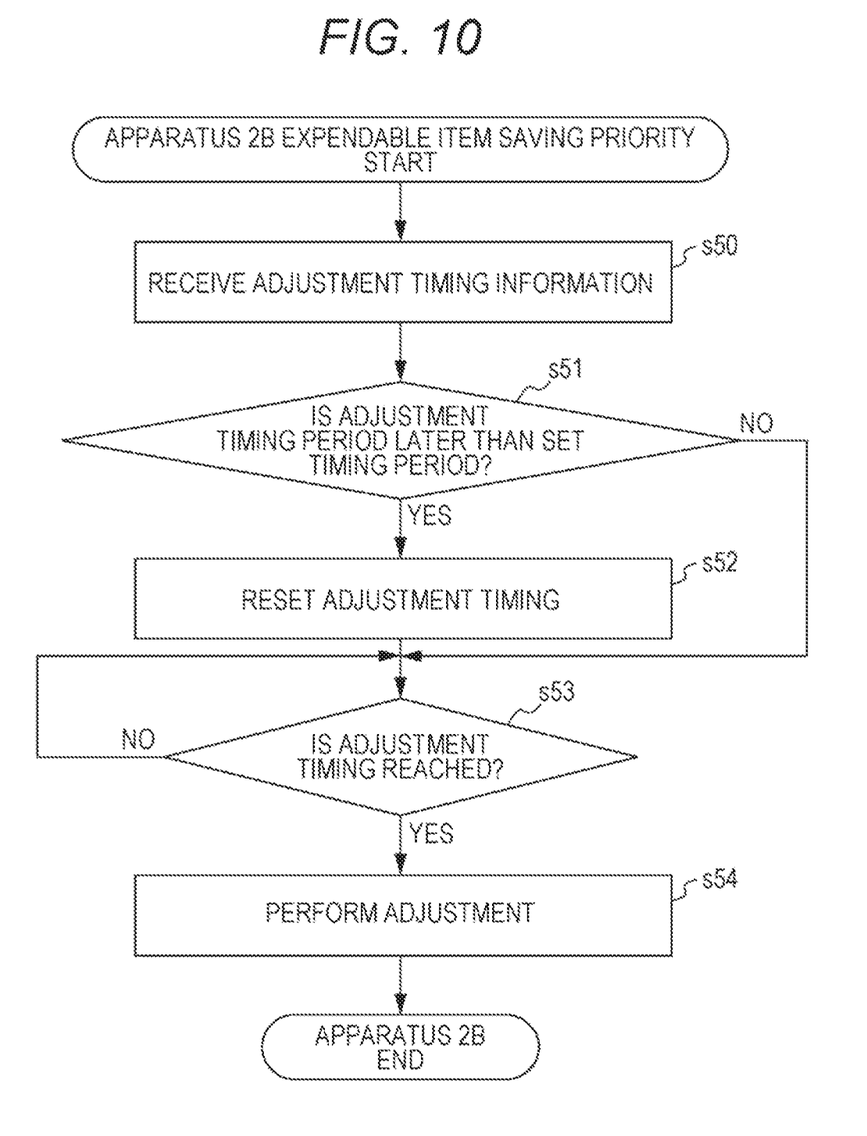
FIG. 10 is a flowchart illustrating a procedure of the adjustment using the other image forming apparatus in which expendable item saving priority is set.

A procedure in the case where expendable item saving priority is set in the image forming apparatus 2B will be described on the basis of the flowchart of FIG. 10. Note that the following procedure is executed by the control of the image controller of the image forming apparatus 2B that receives the adjustment timing information.

The image forming apparatus 2B receives the adjustment timing information from the server (step s50), and it is determined whether the received adjustment timing period is later than the set timing period (step s51).

When the received adjustment timing period is not later than the set timing period (No in step s51), it is determined whether the set adjustment timing is reached (step s53). When the received adjustment timing period is later than the set timing period (Yes in step s51), an adjustment timing is reset (step s52), and it is determined whether the set adjustment timing is reached (step s53).

When the adjustment timing is not reached in step s53 (No in step s53), it waits until the adjustment timing is reached.

When the adjustment timing is reached (Yes in step s53), the adjustment is performed (step s54), and the procedure is terminated.

According to the procedure described above, the adjustment timing can be set from a panel or the like of an image forming apparatus including no reading apparatus. Examples of a setting item include "server instruction priority", "image quality priority", and "expendable item saving priority". In the case of the "server instruction priority", adjustment is constantly performed at the timing instructed by the server. In the case of the "image quality priority", the instruction from the server is followed only when the adjustment timing instructed from the server is in a period earlier than the preset adjustment timing. In the case of the "expendable item saving priority", the instruction from the server is followed only when the adjustment timing instructed from the server is in a period later than the preset adjustment timing.

Accordingly, in the case of the image quality priority, occurrence of waste printed sheets caused by a delay in adjustment can be suppressed, and, in the case of the expendable item saving priority, consumption of expendable items such as toner and paper sheets caused, by frequent adjustment can be suppressed. Note that this setting may be set for each adjustment content.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image analysis processing system comprising:
a plurality of image forming apparatuses including an image former;
an image reader that reads an image formed on a recording medium by the image former;
an analysis adjuster capable of performing adjustment on the image former by obtaining printing information on the recording medium read by the image reader and analyzing the printing information; and
an adjustment timing determiner that obtains information regarding usage status in the image forming apparatus having been subject to the adjustment, determines, at least on the basis of the information regarding the usage status, a timing for performing adjustment on another predetermined image forming apparatus incapable of performing the adjustment on the basis of a result of analysis of the printing information, and transmits information regarding the timing to the predetermined image forming apparatus,
the image forming apparatus, the image reader, the analysis adjuster, and the adjustment timing determiner being connected to a network.

2. The image analysis processing system according to claim 1, wherein the usage status is one or more of a number of output recording media, an amount of toner used, and a usage status of a part in the image forming apparatus at a time of performing adjustment.

3. The image analysis processing system according to claim 1, wherein the adjustment timing determiner determines the timing on the basis of the usage status and apparatus information of the image forming apparatus.

4. The image analysis processing system according to claim 3, wherein the apparatus information is one or more of model information, supply tray information, and information obtained by an internal sensor.

5. The image analysis processing system according to claim 1, wherein the adjustment timing determiner obtains information regarding adjustment content in the image forming apparatus having been subject to the adjustment.

6. The image analysis processing system according to claim 1, wherein the predetermined image forming apparatus is set as an image forming apparatus similar to the image forming apparatus having been subject to the adjustment.

7. The image analysis processing system according to claim 1, wherein the analysis adjuster is included in the image forming apparatus or the image reader.

8. The image analysis processing system according to claim 1, wherein the adjustment timing determiner is included in the image forming apparatus or the image reader.

9. The image analysis processing system according to claim 1, wherein the adjustment timing determiner is included in a server connected to the network.

10. The image analysis processing system according to claim 1, wherein the analysis adjuster transmits information regarding usage status in the image former having been subject to the adjustment to the adjustment timing determiner.

11. The image analysis processing system according to claim 10, wherein when the adjustment is determined to be performed to solve a problem caused by a machine-specific factor of the image former, the analysis adjuster does not transmit the information to the adjustment timing determiner or transmits information indicating machine-specific adjustment together.

12. The image analysis processing system according to claim 1, wherein the predetermined image forming apparatus is capable of setting whether an adjustment timing prioritizes an instruction from the adjustment timing determiner in advance on a side of the image forming apparatus.

13. The image analysis processing system according to claim 12, wherein the predetermined image forming apparatus allows a user to set the adjustment timing in advance from "instruction priority", "image quality priority", and "expendable item saving priority" on the side of the image forming apparatus.

14. The image analysis processing system according to claim 13, wherein the predetermined image forming apparatus performs the adjustment constantly at an instructed timing in a case where the "instruction priority" is set, follows an instruction only when the instructed adjustment timing is in a period earlier than the adjustment timing preset in the image forming apparatus in a case where the "image quality priority" is set, and follows the instruction only when the instructed adjustment timing is in a period later than the adjustment timing preset in the image forming apparatus in a case where the "expendable item saving priority" is set.

15. The image analysis processing system according to claim 13, wherein the setting can be performed for each adjustment content.

16. A management apparatus connected to a network to which:
- a plurality of image forming apparatuses that performs image processing related to image formation;
- an image reader that reads an image formed on a recording medium by an image former; and
- an analysis adjuster capable of performing adjustment on the image former by obtaining printing information on the recording medium read by the image reader and analyzing the printing information are connected, the management apparatus comprising
an adjustment timing determiner that obtains information regarding usage status in the image former having been subject to the adjustment, determines, at least on the basis of the information regarding the usage status, a timing for performing adjustment on another predetermined image forming apparatus incapable of performing the adjustment on the basis of a result of analysis of the printing information, and transmits information regarding the timing to the predetermined image forming apparatus.

17. An image processing apparatus connected to a network to which:
- a plurality of image forming apparatuses including an image former;
- an image reader that reads an image formed on a recording medium by the image former;
- an analysis adjuster capable of performing adjustment on the image former by obtaining printing information on the recording medium read by the image reader and analyzing the printing information; and
- an adjustment timing determiner that obtains information regarding usage status in the image former having been subject to the adjustment, determines, at least on the basis of the information regarding the usage status, a timing for performing adjustment on another predetermined image forming apparatus incapable of performing the adjustment on the basis of a result of analysis of the printing information, and transmits information regarding the timing to the predetermined image forming apparatus are connected, the image processing apparatus comprising the analysis adjuster and the adjustment timing determiner.

18. The image processing apparatus according to claim 17, further comprising the image reader.

19. A non-transitory recording medium storing a computer readable program causing a computer, which is connected to a network and controls adjustment in a plurality of image forming apparatuses including an image former, to execute:
- obtaining information regarding usage status in the image forming apparatus at a time of performing adjustment on the image former by analyzing printing information obtained by reading an image on a recording medium formed by the image former;
- determining a timing to perform adjustment on another predetermined image forming apparatus incapable of performing the adjustment on the basis of a result of analysis of the printing information at least on the basis of the information regarding the usage status; and
- transmitting information regarding the timing to the predetermined image forming apparatus.

20. The non-transitory recording medium storing a computer readable program according to claim 19, the program causing the computer to further execute
performing adjustment on the image former by obtaining printing information on the recording medium read by an image reader, and analyzing the printing information.

* * * * *